United States Patent [19]

Fitzgerald et al.

[11] Patent Number: 4,468,605
[45] Date of Patent: Aug. 28, 1984

[54] TIMED VOLTAGE CLAMP FOR BATTERY CHARGER

[75] Inventors: Edward A. Fitzgerald, Ft. Lauderdale; Darrell A. Pfeffer, Sunrise, both of Fla.

[73] Assignee: Motorola, Inc., Schaumburg, Ill.

[21] Appl. No.: 367,327

[22] Filed: Apr. 12, 1982

[51] Int. Cl.³ .............................................. H02J 7/04
[52] U.S. Cl. ..................................... 320/36; 320/38; 320/40
[58] Field of Search ................................. 320/35–40, 320/43

[56] References Cited

U.S. PATENT DOCUMENTS

| | | | |
|---|---|---|---|
| 3,070,748 | 12/1962 | Worebey et al. | 325/492 |
| 3,624,481 | 11/1971 | Macharg | 320/39 |
| 3,652,915 | 3/1972 | Eberts | 320/31 |
| 3,667,026 | 5/1972 | Bogut et al. | 320/36 |
| 3,700,997 | 10/1972 | Smith | 320/20 |
| 3,736,489 | 5/1973 | Mullersman | 320/35 |
| 3,855,516 | 12/1974 | Fairchild | 320/22 |
| 3,887,585 | 5/1975 | Burkett et al. | 320/31 |
| 3,959,707 | 5/1976 | Stephens | 320/39 |
| 4,006,396 | 2/1977 | Bogut | 320/31 |
| 4,006,397 | 2/1977 | Catotti et al. | 320/31 |
| 4,087,733 | 5/1978 | Casagrande | 320/21 |
| 4,209,736 | 6/1980 | Reidenbach | 320/35 |
| 4,341,988 | 7/1982 | Small | 320/40 |

OTHER PUBLICATIONS

Fast Charging Systems for Ni–Cd Batteries, Applications Note AN-447, Prepared by David A. Zinder, Motorola Semiconductor Products Inc.

Primary Examiner—William M. Shoop
Assistant Examiner—Anita M. Ault
Attorney, Agent, or Firm—Margaret Marsh Parker; James W. Gillman

[57] ABSTRACT

A battery charging device wherein the charging current level is controllable by a thermal circuit responsive to battery temperature also includes a circuit responsive to battery voltage and a timing circuit. The timing circuit is activated when a battery is inserted into the device for charging and immediately times a very brief interval. If the battery voltage exceeds a predetermined level during the timed interval, the charging current level is reduced as by the thermal circuit. The circuit protects both cold and charged batteries from damage due to overcharging.

7 Claims, 2 Drawing Figures 4,468,605

TIMED VOLTAGE CLAMP FOR BATTERY CHARGER

BACKGROUND OF THE INVENTION

This invention relates to the field of charging devices as for nickel-cadmium batteries and, more particularly, to the prevention of excessive over-charging under any set of battery conditions.

It is well known that over-charging of an already charged battery or charging of a cold battery can cause gassing, electrolyte venting, loss of battery capacity and actual physical damage. Prior art protection circuits have typically provided an absolute voltage clamp which is set, for example, at the gassing voltage of approximately 1.6 volts per cell. However, batteries vary greatly due to a number of parameters such as age, temperature and memorization, plus the variations between manufacturers and even different manufacturing lots from any one source. An absolute voltage clamp can prevent gassing due to a cold battery (T < +5° C.) but will not provide protection against over-charging, particularly, if a cold and fully-charged battery should be inadvertently put on charge. This is a relatively frequent occurrence in a two-way communications system where the portable units are routinely put into a charging unit at the end of the user's tour of duty; e.g., in police, fire, railroad yard service, etc. Another protection circuit, used for a high-charging rate mode, charges a timing capacitor and when a predetermined voltage appears on the capacitor, the charging of the battery is stopped. In this mode, all other controls such as temperature and current are overridden unless the predetermined voltage is dangerously high.

SUMMARY OF THE INVENTION

It is an object, therefore, of the present invention to prevent damage to batteries during the charging period.

It is a particular object to prevent damage due to over-charging of a nearly charged battery or of a cold battery.

It is another object to provide voltage limiting at a conservative voltage level for a brief period at the beginning of the charging period without interference to other desired charging control circuits.

These and other objects which will become apparent are provided by a circuit which measures the approximate derivative of the battery voltage (dV/dt) during the first part of the charging period. Since either a very cold battery or a nearly charged one will reach a high voltage very quickly while a discharged battery will approach normal voltage very gradually, it is only necessary to limit the maximum voltage severely for a few minutes at the beginning of the charging period. The normal temperature-controlled switching circuit can then function as usual.

DETAILED DESCRIPTION OF THE PREFERRED EMBODIMENT

Figure 1:
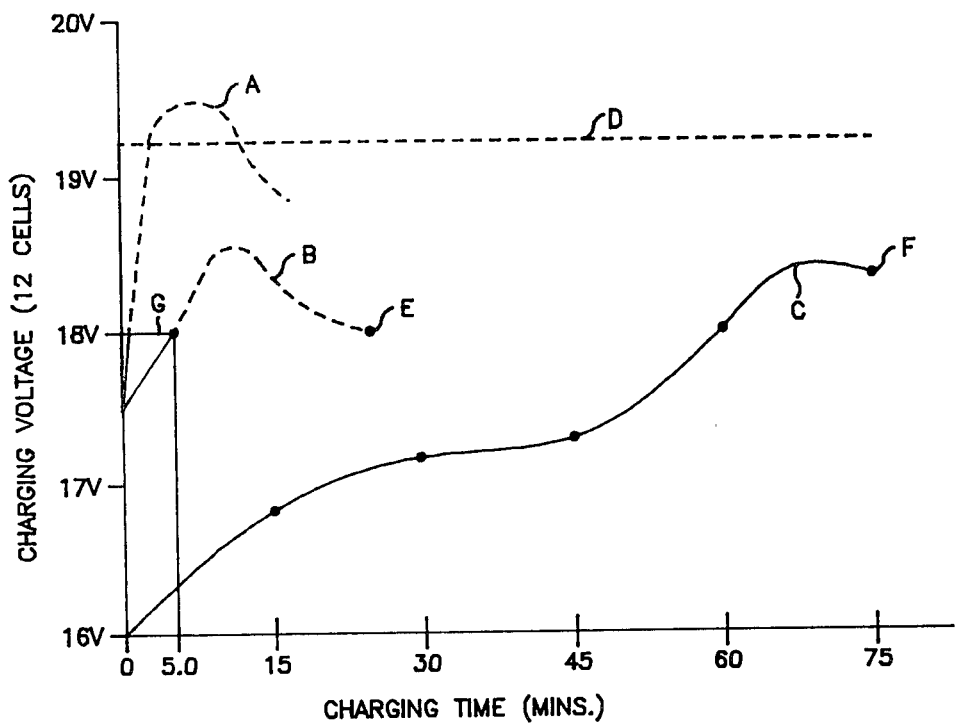
FIG. 1 is a chart of charging voltage versus charging time with the circuit of the invention and without.
Figure 2:
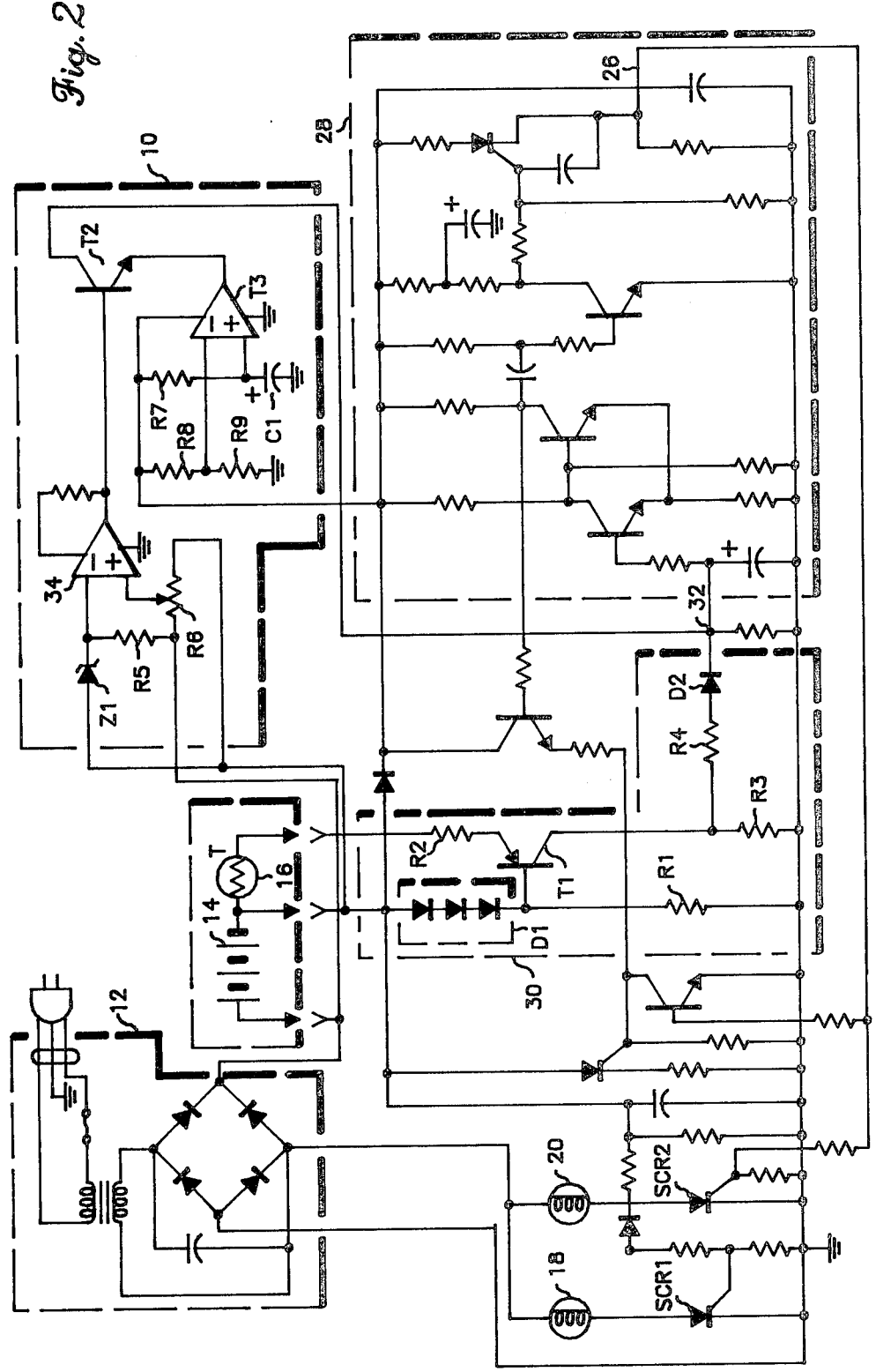
FIG. 2 is a schematic diagram of a charging device including the present invention.

The purpose and operation of the present invention, as shown in FIG. 2, will be described with respect to the voltage versus time chart of FIG. 1. Charging voltages are given for a battery of 12-1.5 V cells. Curve A illustrates, by the combined solid and broken line, the charging voltage across a cold (T < +5° C.) battery if no clamping (limiting) existed. An arbitrary starting value of 17.5 volts is shown here with a rise to nearly 20 V in less than 10 minutes. Such a rapid rise and high peak voltage would cause gassing and permanent damage to the battery. In most prior art circuits, an absolute voltage clamp is used as shown by the line D.

Curve B, solid and broken lines together, illustrates a typical voltage curve for an already charged or very nearly charged battery when an attempt is made to recharge it. While curve B does not reach as high a value as curve A, the battery has been subjected to an unnecessary over-heating cycle which is ended only by the temperature cut-off circuit (TCO) at a point E.

Curve C shows a normal charging sequence (battery neither cold nor charged) which begins at a lower voltage (16 volts) than curves A or B. Curve C rises very gradually over approximately an hour of rapid charging, reaches a temperature high enough to activate the TCO (at a point F) without reaching an excessively high voltage. The broken line D was included to show the operation of absolute clamps of the prior art. In order to avoid interfering with a normal charge (as in curve C) it was necessary to clamp or limit the battery voltage at a higher level (typically 19.2 volts for a 12 cell battery) than is desirable. It can be seen that while the cold battery (Curve A) would have been removed from rapid charging after reaching the prior art clamp level D, the already-charged battery would be overcharged for 20 minutes or so. This has been shown to cause memorization problems.

With the addition of the circuit of the invention, the situation changes to that shown by the solid lines only. As will be further explained with respect to FIG. 2, the circuit provides an approximate measurement of the rate of change of battery voltage (dV/dt) by limiting the voltage to 18 volts (line G) for a very brief, timed period such as five minutes at the beginning of the rapid charge. In the case of an uncharged battery (Curve C) the timed period will be over long before the battery voltage reaches the limiting voltage (line G) and the charging sequence will proceed normally.

In FIG. 2, the new elements of the circuit of the invention are shown within the broken line referenced as numeral 10. Other elements include a power supply 12 and a battery 14 with associated thermistor 16. The thermistor is usually positioned immediately adjacent the battery to respond to battery temperature. A "battery charging" lamp 18 and "trickle charge" lamp 20 are coupled between the power supply 12 and SCR 1 and SCR 2 respectively. SCR1 is controlled by the battery voltage and SCR2 is controlled by the output 26 of a control circuit 28 which switched the battery from "rapid charge" to "trickle charge".

A thermal circuit 30 is coupled to the thermistor 16 and includes a transistor T1, three diodes D1 and a resistor R1 for biasing T1, R2 in series with the thermistor, R3 for biasing the collector of T1, and R4 and D2 coupled to a point 32 which is the input for the control circuit 28. Thus, when a predetermined battery temperature is sensed by the thermistor 16, the battery charge level is switched from "rapid" to "trickle" charge.

Within the circuit 10 are a resistor R5 and zener diode Z1 coupled in series across the battery 14, with center point coupled to one input of a comparator 34. Also across the battery 14 is a potentiometer R6 with center tap coupled to the second input of the comparator 34. R6 is only used to adjust for the individual zener voltage drop and any offset in the comparator. Obviously, the potentiometer could be replaced by two resistors which were measured to provide the proper center tap voltage. If the battery voltage reaches the preset clamping voltage before the end of the timed interval, an output transistor T2 is allowed to conduct, pulling the collector of T2 down. Since the collector of T2 is coupled to the control input 32 of the circuit 28, the circuit 28 switches the battery charge from "rapid" to "trickle". If, however, the battery voltage does not reach the preset clamping voltage and the timed interval runs out, the emitter of T2 is no longer at ground potential and the collector of T2 stays high regardless of the battery voltage. The timing circuit in the circuit 10 includes a timer T3 which can be of the type of IC known in the field as a "555", the interval of which is set by an RC network R7 and C1. Resistors R8 and R9 provide the bias voltage for the timer T3. In the present application the interval is set at around five minutes for optimum battery protection, then the timer output terminal is no longer at ground level. Thus the circuit 10 is now effectively removed from the charging circuit and the thermal circuit 30 alone controls the charging level.

It is also possible to add a recycling circuit to the circuit of FIG. 2 whereby after perhaps 15 or 20 minutes, the timer would be reset. Thus a previously cold battery would be charged at the higher rate after it had time to warm up.

The circuit of the invention thus has several advantages over any known prior art. A lower maximum battery voltage (1.5 volts per cell as opposed to 1.6 volts per cell) provides significantly greater protection to either a cold battery or an already charged battery. Since overheating and over-charging are probably the primary causes of "memorization", this is an important advantage. Since this voltage limit is only imposed during the first few minutes of a charging cycle, it can be at a lower level than if it were an absolute (permanent) clamping voltage as in the prior art. Previously, the absolute voltage had to be set high enough to allow the normal charging cycle leading to temperature cutoff and to include the variations between individual batteries.

The charging circuit described above is for use with a battery having a temperature sensing device placed adjacent to or in contact with some portion of the battery. The circuit includes a power supply for supplying DC power to the battery. This supply may be derived from an exterior AC source. A switching circuit coupled to the power supply controls the level of power supplied to the battery in response to an inputted control signal. Typically, the power levels will be "full charge" power and "trickle" power. One control circuit is coupled to supply a first control signal to the switching circuit in response to a predetermined battery temperature as sensed by the sensing device. A second control circuit is coupled to the power supply for supplying a second control signal to the switching circuit in response to a predetermined battery voltage. A timing circuit enables the second control circuit for a predetermined time period, the timed period starting at the beginning of each charging cycle; e.g. when a battery is inserted into a charging device.

Thus there has been shown and described one embodiment of a protection circuit for charging batteries under all conditions of temperature and charge. Other embodiments and modifications are possible and it is intended that the invention be limited only by the scope of the appended claims.

What is claimed is:

1. A charging circuit for use with a battery having an associated temperature sensing device, the circuit comprising;
    power supply means for supplying DC power to the battery;
    switching means for controlling the level of power supplied by the power supply means to the battery in response to a control signal;
    a first control circuit coupled to supply a first control signal to the switching means in response to a predetermined battery temperature sensed by the sensing device;
    a second control circuit coupled to supply a second control signal to the switching means in response to a predetermined battery voltage; and
    timing means for enabling the second control circuit for a predetermined time period, said period beginning at the start of each charge cycle.

2. A charging circuit according to claim 1 and wherein the power supply means includes a source of alternating current and a rectifying means.

3. A charging circuit according to claim 1 and wherein the second control circuit includes a source of reference voltage, means for applying a voltage proportional to the battery voltage, and comparator means for comparing the reference voltage and the proportional voltage.

4. A charging circuit according to claim 3 and wherein the second control circuit includes a switching circuit controlled by the output of the comparator means and enabled by the timing means.

5. A charging circuit according to claim 1 and wherein the switching means provides a reduced level of power to the battery in response to a sensed battery temperature higher than the predetermined temperature.

6. A charging circuit according to claim 1 and wherein the switching means provides a reduced level of power to the battery in response to the battery voltage higher than the predetermined voltage.

7. A charging circuit according to claim 1 and wherein the switching means changes the power level from full charge power to a greatly reduced level.

* * * * *